June 26, 1934.   C. P. COOK   1,964,455
MEANS FOR BRANDING PORK LOINS
Original Filed Nov. 6, 1930

Calvin P. Cook
INVENTOR

BY
ATTORNEY

WITNESS

Patented June 26, 1934

1,964,455

UNITED STATES PATENT OFFICE 1,964,455

MEANS FOR BRANDING PORK LOINS

Calvin P. Cook, Arlington, Mass., assignor to Swift and Company, Chicago, Ill., a corporation of Illinois Original application November 6, 1930, Serial No. 493,797. Divided and this application March 26, 1932, Serial No. 601,391

1 Claim. (Cl. 101—28)

My invention relates to the branding of meats, particularly pork loins.

One of the objects of this invention is to provide an improved device for applying dry pigment to the fatty surface of meat with a cutting or penetrating tool, whereby slits outlining the desired letters may be formed and the dry pigment carried into such slits.

This application is a division of my application entitled, "Method for branding pork loins," Serial Number 493,797, filed November 6, 1930.

A preferred embodiment of my improved device is shown in the accompanying drawing in which.

Figure 1:
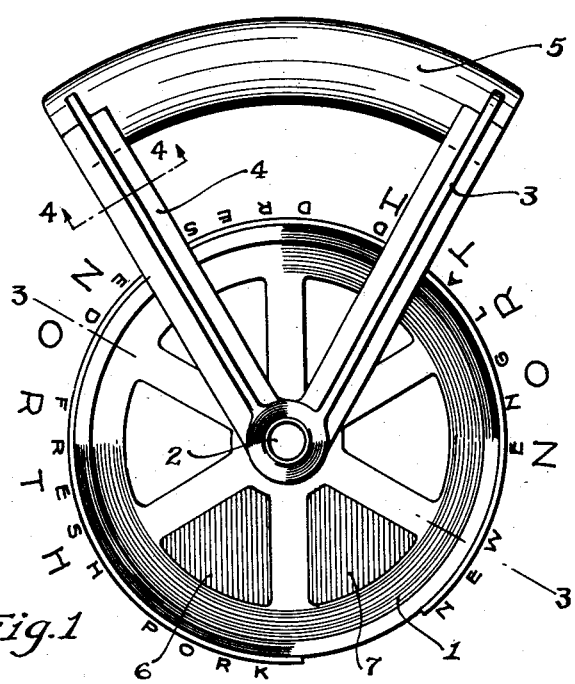
Figure 1 is a side view of the improved branding tool.
Figure 2:
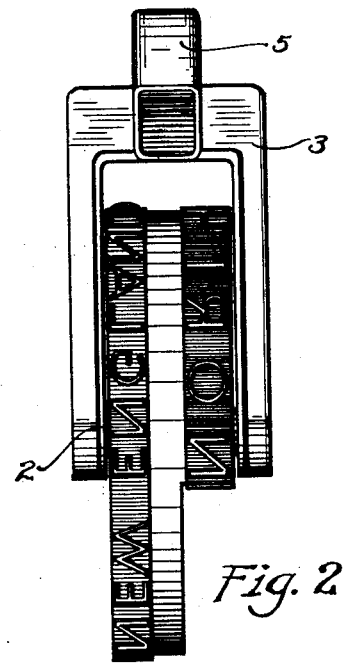
Figure 2 is a front view thereof.
Figure 3:
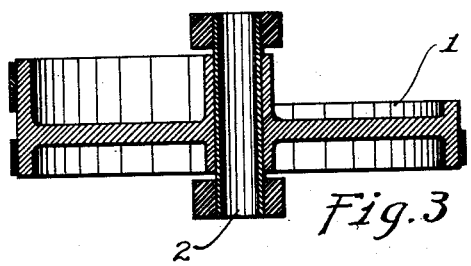
Figure 3 is a sectional view through line "3—3" of Figure 1.
Figure 4:
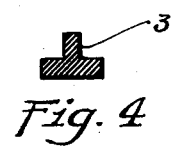
Figure 4 is a sectional view through one of the supporting arms of the handle.
Figure 5:
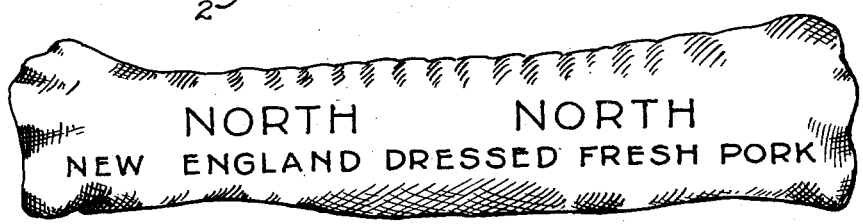
Figure 5 represents a cut of meat such as a pork loin with the brand applied thereto.
Figure 6:
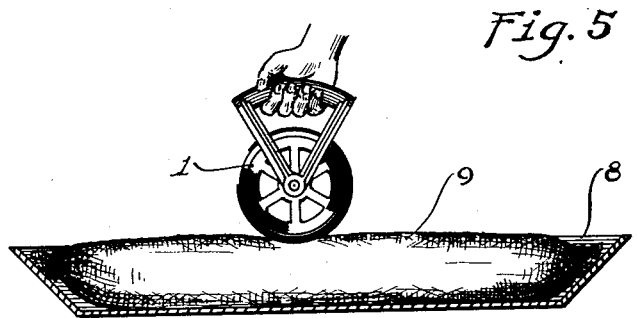
Figure 6 shows in perspective a pigment container with one side of the pan removed and shows how the pigment is applied to the branding tool.
Figure 7:
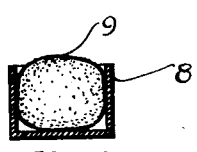
Figure 7 is a transverse sectional view of the pigment container.

A wheel or roller 1 is axially mounted on a transversely extending shaft 2 revolvably mounted in a frame comprising centrally located bearing members disposed at opposite sides of the wheel and from which bearing members there extend radial U-shaped handle supports or end frame members 3 and 4 that straddle the roller or wheel 1. The end members 3 and 4 diverge in passing from the centrally located bearing members. The end members 3 and 4 may in fact be referred to as radially and outwardly extending end members and to the outer portions of these radially extending handle supports 3 and 4 there is secured an arc-shaped longitudinally extending handle 5 which is radially spaced from the peripheral portion of the wheel or roller 1, one end of the handle 5 being connected to the outer portion of the U-shaped radial support 3 and the other end of the handle 5 being connected to the outer portion of the radial U-shaped support 4. The wheel 1 is provided with a plurality of, specifically two rows of, letterings, the letters being of the blade-like projecting type. In the tool as shown, one row of lettering occupies slightly over half the circumference of the wheel or, in other words, the peripheral portion of the wheel which carries this row of lettering extends along only a portion of the wheel periphery, the other row extends about the entire circumference or, in other words, the peripheral portion carrying this row of lettering extends for the full or entire circumference of the wheel; the result of the construction just referred to is that in transverse directions a part of the wheel face is substantially greater than other parts thereof. The spacing of letters is indicated by lettering about the circumference of the wheel in Figure 1. Counter weights 6 and 7 are provided to assure that each brand is commenced at the beginning of the lettering. In Figure 6, pan 8 holds a stockinette tubing 9 which is filled with a pigment such as paprika. The fabric being porous permits sufficient of the paprika to pass through upon application of pressure to deposit enough paprika on the blade-like projecting letters to give a clear compressed brand.

My improved branding tool permits more extensive branding than possible with the small rocker type of brander. The counter weights assure that each brand will be commenced with the proper letter. It is known, of course, that a powdered pigment such as paprika will adhere to the grease covered letters of a brander of the blade-like projecting type. However, if the letters are dipped directly into the loose paprika, it is necessary to remove the excess paprika adhering to the letters before branding. By my method of encasing the paprika in a stockinette, this step is eliminated and assures a clearer brand.

I claim:

A meat marker comprising a roller and a frame provided with a handle and in which frame the roller is mounted so as to revolve about a transversely extending axis, said roller having a plurality of lines of brand-like marking members on the periphery thereof, one of which lines is arranged along a peripheral portion of the roller that extends completely about or along the entire circumference of the roller, another of said lines being arranged along a peripheral portion that extends only part way along the roller circumference whereby in transverse directions certain peripheral sections of the roller are substantially less than other peripheral sections, said roller having weighted sections arranged whereby when otherwise free to do so the roller automatically assumes a position with the starting portion of one line lowermost.

CALVIN P. COOK.